United States Patent
Cho et al.

(10) Patent No.: US 7,869,495 B2
(45) Date of Patent: Jan. 11, 2011

(54) OFDM RECEIVER USING TIME-DOMAIN AND FREQUENCY-DOMAIN EQUALIZING AND TIME DOMAIN EQUALIZER

(75) Inventors: Young Ha Cho, Gyunggi-do (KR); Kyung Uk Kim, Seoul (KR); Hyun Suk Lee, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 643 days.

(21) Appl. No.: 11/945,593

(22) Filed: Nov. 27, 2007

(65) Prior Publication Data
US 2008/0123767 A1  May 29, 2008

(30) Foreign Application Priority Data
Nov. 28, 2006  (KR)  ....................... 10-2006-0118336

(51) Int. Cl.
*H03K 7/30*  (2006.01)
(52) U.S. Cl. ..................................................... 375/229
(58) Field of Classification Search ......... 375/229–233, 375/260
See application file for complete search history.

(56) References Cited

U.S. PATENT DOCUMENTS
6,628,704 B1 *  9/2003  Long et al. .................. 375/219

FOREIGN PATENT DOCUMENTS
KR  10-2004-0110341 A  12/2004

OTHER PUBLICATIONS
Korean Intellectual Property Office, Office Action mailed Jan. 24, 2008.

* cited by examiner

*Primary Examiner*—Kevin Y Kim
(74) *Attorney, Agent, or Firm*—Lowe Hauptman Ham & Berner LLP

(57) ABSTRACT

An orthogonal frequency division multiplexing (OFDM) receiver capable of improving equalization performance is provided. In the OFDM receiver receiving an OFDM signal having a frame structure constructed with one reference symbol and a plurality of data symbols following the reference symbol, the OFDM receiver includes: a synchronizer which detects a position of the reference symbol from the received OFDM signal; a time-domain equalizer which equalizes in a time domain the data symbols that are separated by a distance longer than a predetermined distance from the position of the reference symbol; an FFT (fast Fourier transform) unit which performs an FFT process on the OFDM signal; and a frequency-domain equalizer which equalizes in a frequency domain the data symbols that are separated by a distance shorter than a predetermined distance from the position of the reference symbol.

11 Claims, 3 Drawing Sheets

OFDM RECEIVER USING TIME-DOMAIN AND FREQUENCY-DOMAIN EQUALIZING AND TIME DOMAIN EQUALIZER

CROSS-REFERENCE TO RELATED APPLICATIONS

This application claims the priority of Korean Patent Application No. 2006-118336 filed on Nov. 28, 2006, in the Korean Intellectual Property Office, the disclosure of which is incorporated herein by reference.

BACKGROUND OF THE INVENTION

1. Field of the Invention

The present invention relates to an orthogonal frequency division multiplexing (OFDM) receiver, and more particularly, to an OFDM receiver capable of implementing a frame structure having a small number of reference symbols and a large number of data symbols by selectively using time-domain and frequency-domain equalization schemes and improving OFDM signal reception performance and a time-domain equalizer capable of improving equalization performance.

2. Description of the Related Art

An orthogonal frequency division multiplexing (OFDM) scheme is a well-known high-speed data transmission scheme for the next-generation communication technology. In the OFDM transmission scheme, a sequence of symbols which are serially input is converted into parallel data (parallel symbols) in units of a predetermined block, and a plurality of the parallel symbols are multiplexed with different subcarrier frequencies. In a multi-carrier used for the OFDM scheme, there is a need for orthogonality between carriers. The orthogonality means that a product of two carriers is zero. The orthogonality is a necessary condition for the multi-carrier. The OFDM scheme is implemented by fast Fourier transform (FFT) and inverse fast Fourier transform (IFFT). The OFDM scheme can be simply performed by using the orthogonality between the carriers and the definition of the FFT.

Particularly, in the OFDM scheme, each symbol has a cyclic prefix (CP). If delay spread caused from a channel is shorter than a length of the CP, all the subcarriers are maintained to have a frequency multiple of a reference frequency, so that only phase rotation caused from time delay occurs without inter-carrier interference (ICI). If a transmission signal used for an OFDM scheme is a differential encoding signal, a phase difference thereof can be detected at the time of demodulation, so that the influence of the RF channel can be minimized.

However, the maximum delay spread caused from an RF channel cannot always be shorter than the length of the CP. If the maximum delay spread becomes longer than the length of the CP, the ICI and inter-symbol interference (ISI) occur, so that reception performance of an OFDM receiver is greatly deteriorated.

In order to avoid the deterioration in the reception performance of the OFDM receiver, an OFDM equalization scheme may be used. The OFDM equalization scheme is mainly classified into a time-domain equalization scheme and a frequency-domain equalization scheme.

The frequency-domain equalization scheme has an advantage in that deformation of the subcarriers caused from a multi-path channel can be compensated. However, in use of the frequency-domain equalization scheme, a separate reference symbol (sometimes, referred to as a pilot symbol) is necessary used. In addition, as a distance of a data symbol from the reference symbol becomes longer (in a case where the data symbol is separated by 50 or more symbols from the reference symbol), equalization performance is deteriorated.

On the other hand, the time-domain equalization scheme has an advantage in that the equalization can be performed by using the CP included in the OFDM symbol without use of a separate reference symbol. However, if the maximum delay spread is large, effective equalization performance cannot be obtained. In addition, since only the errors in the shot time interval can be corrected, the equalization performance is lowered in comparison with the frequency-domain equalization scheme.

Particularly, the OFDM signal used for the currently-commercialized digital multimedia broadcasting (DMB) has a frame structure where one frame includes 76 symbols of which the first symbol is designated as the reference symbol. Therefore, if the frequency-domain equalization scheme is applied to the DMB, the equalization performance for a symbol separated by a long distance from the reference symbol is deteriorated. Although the time-domain equalization scheme is applied to the DMB, it is difficult to improve the equalization performance due to the shortcoming of the time-domain equalization.

SUMMARY OF THE INVENTION

An aspect of the present invention provides an orthogonal frequency division multiplexing (OFDM) receiver capable of improving reception performance for an OFDM signal having a frame structure having a small number of a reference symbol and a large number of data symbols by selectively using a time-domain equalization scheme and a frequency-domain equalization scheme.

Another aspect of the present invention provides a time-domain equalizer capable of improving equalization performance.

According to an aspect of the present invention, there is provided an OFDM receiver receiving an OFDM signal having a frame structure constructed with one reference symbol and a plurality of data symbols following the reference symbol, the OFDM receiver comprising: a synchronizer which detects a position of the reference symbol from the received OFDM signal; a time-domain equalizer which equalizes in a time domain the data symbols that are separated by a distance longer than a predetermined distance from the position of the reference symbol; an FFT (fast Fourier transform) unit which performs an FFT process on the OFDM signal; and a frequency-domain equalizer which equalizes in a frequency domain the data symbols that are separated by a distance shorter than a predetermined distance from the position of the reference symbol.

In the above aspect, the OFDM receiver may further comprise a demodulator which demodulates the data symbols output from the FFT unit in case of the data symbols that are separated by a distance longer than the predetermined distance from the position of the reference symbol and the frequency-domain-equalized data symbols output from the frequency-domain equalizer in case of the data symbols that are separated by a distance shorter than a predetermined distance from the position of the reference symbol.

In addition, the synchronizer may generate symbol enable pulses at starting points of the symbols in the frame structure, and the OFDM receiver may further comprise a counter which counts the number of symbol enable pulses and detects distances of the data symbols from the position of the reference symbol detected by the synchronizer.

In addition, the OFDM receiver may further comprise: a first switch which directs the data symbols of which distances detected by the counter are longer than the predetermined distance to the time-domain equalizer and the data symbols of which distances detected by the counter are smaller than the predetermined distance to the FFT unit; and a second switch which directs the FFT-processed data symbols of which distances detected by the counter are smaller than the predetermined distance to the frequency-domain equalizer and the FFT-processed data symbols of which distances detected by the counter are longer than the predetermined distance to the demodulator.

In addition, the time-domain equalizer may comprise: a time-domain equalization arithmetic unit which outputs a data symbol and generates a time-domain-equalized data symbol; a delay unit which delays samples of the data symbol output from the time-domain equalization arithmetic unit by the number of samples excluding a CP (cyclic prefix) of the data symbol; a first update vector generator which generates a first update vector by using an error between the sample currently output from the time-domain equalization arithmetic unit and the delayed sample; and a second update vector generator which generates a second update vector by obtaining a plurality of transformation function values of the first update vector and accumulatively adding the transformation function values, wherein the time-domain equalization arithmetic unit generates the time-domain-equalized data symbol by multiplying a complex conjugate transposed value of the second update vector with the samples of the input data symbol.

In addition, the time-domain equalization arithmetic unit may generate the time-domain-equalized data symbol by using the following Equation 1, wherein the first update vector is generated by using the following Equation 2, wherein the second update vector is generated by using the following Equation 3, $$v_n[i] = b^H_{n-1,N_B} r_n[i] \quad \text{[Equation 1]}$$

wherein $r_n[i]$ denotes an i-th sample of an n-th OFDM symbol, $v_n[i]$ denotes an i-th sample of an n-th time-domain-equalized OFDM symbol, and $b_{n-1}$ denotes the second update vector, $$w_{n-1}[i] = w_{n-1}[i-1] - 2\mu e_n^*[i](r_n[i] - r_n[i-N_U]) \quad \text{[Equation 2]}$$

wherein w denotes the first update vector, e denotes the error between the sample and the delayed sample, and μ denotes an adaptation gain, $$b_{n-1,N_B[i]} = \sum_{k=N_0}^{N_B} g(w_k[i], \beta_k), \text{ and} \quad \text{[Equation 3]}$$

wherein $b_{n-1}$ the second update vector, g denotes the transformation function of the first update vector, $\beta_k$ denotes a coefficient, $N_0$ denotes a starting point where the time-domain equalization is applied, and $N_B$ denotes the number of first update vectors used to generate the second update vector.

In addition, the transformation function may be defined as the following Equation 4, $$g(w_k, \beta_k) = \beta_k \cdot w_k[i]. \quad \text{[Equation 4]}$$

In addition, the frequency-domain equalizer may comprise: a channel response estimator which generates a channel response function expressing a channel response according to the error between the predetermined stored reference symbol and the FFT-processed data symbol corresponding to the position of the reference symbol; and a divider which generates a frequency-domain-equalized FFT-processed data symbol by dividing the FFT-processed data symbol with the channel response function.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will now be described in detail with reference to the accompanying drawings. The embodiments of the present invention can be modified in various aspects, and the scope of the invention is not limited to the embodiments. It should be noted that the embodiments of the present invention is provided for the better understanding of the ordinarily skilled in the art. In the specification, terms of components are defined in consideration of functions of the components. Therefore, the terms may be changed according to an intention the ordinarily skilled in the art or a usage in the art, but not limited to technical components having restrictive meanings.

Figure 1:
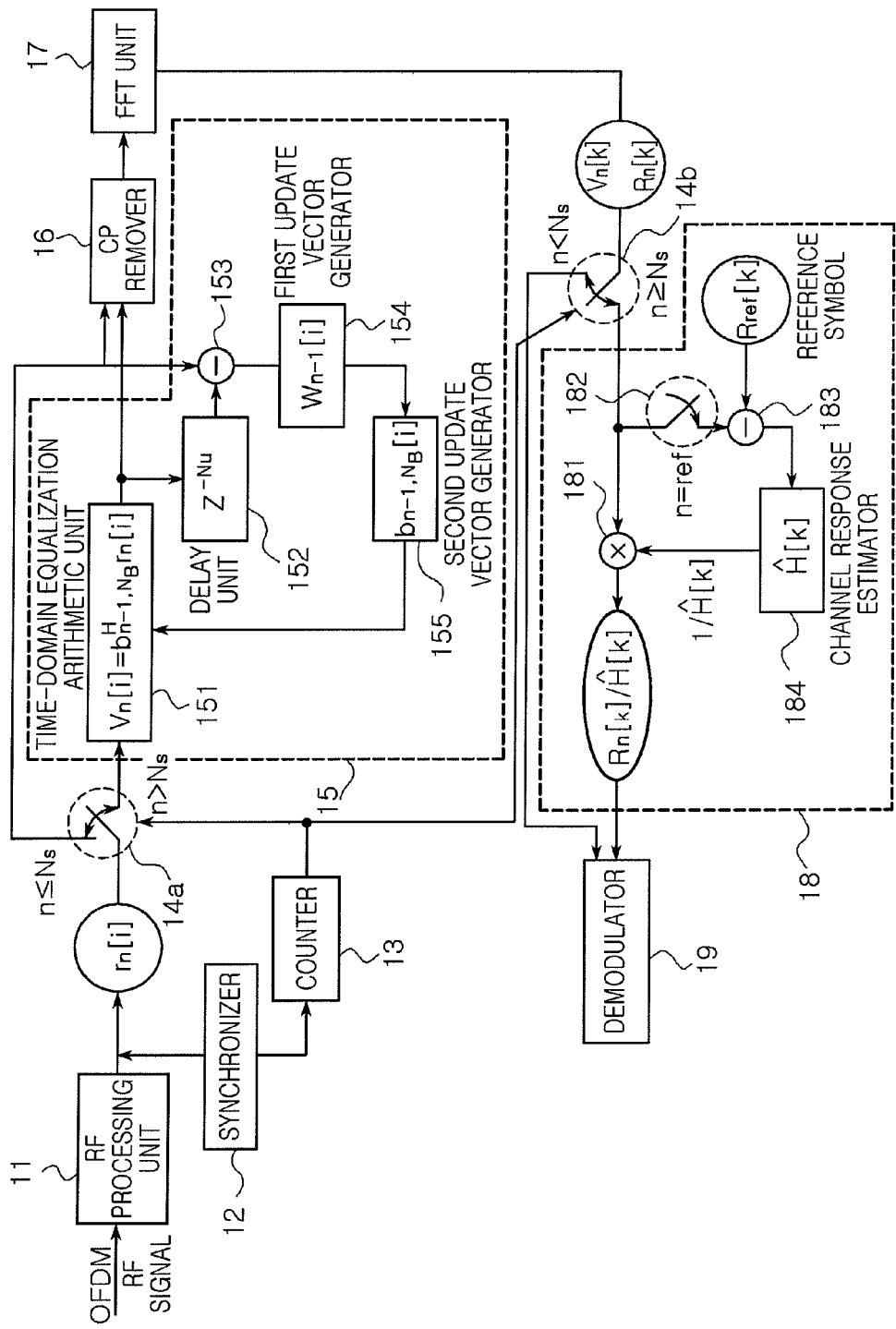
FIG. 1 is a block diagram illustrating a configuration of an OFDM receiver according to an embodiment of the present invention.

FIG. 1 is a block diagram illustrating a configuration of an orthogonal frequency division multiplexing (OFDM) receiver according to an embodiment of the present invention.

Referring to FIG. 1, the OFDM receiver according to the embodiment includes an radio frequency (RF) processing unit 11, a synchronizer 12, a counter 13, first and second switches 14a and 14b, a time-domain equalizer 15, a cyclic prefix (CP) remover 16, a fast Fourier transform (FFT) unit 17, a frequency-domain equalizer 18, and a demodulator 19.

The RF processing unit 11 down-converts an OFDM signal into a baseband. In order to solve problems of high cost and system complexity in the currently-commercialized digital multimedia broadcasting (DMB) or digital audio broadcasting (DAB), a direct converting scheme or a zero-IF scheme is employed. In the direct converting scheme or the zero-IF scheme, a process for converting an RF signal into an intermediate frequency (IF) signal is omitted, but the RF signal is directly converted into a baseband signal. The RF processing unit 11 can down-convert an RF OFDM signal into the baseband by using the direct converting scheme.

It can be understood by the ordinarily skilled in the art that the RF processing unit 11 disclosed in the specification can perform a series of well-known OFDM signal processes from the baseband down-converting process before a time-domain equalization process.

Figure 2:
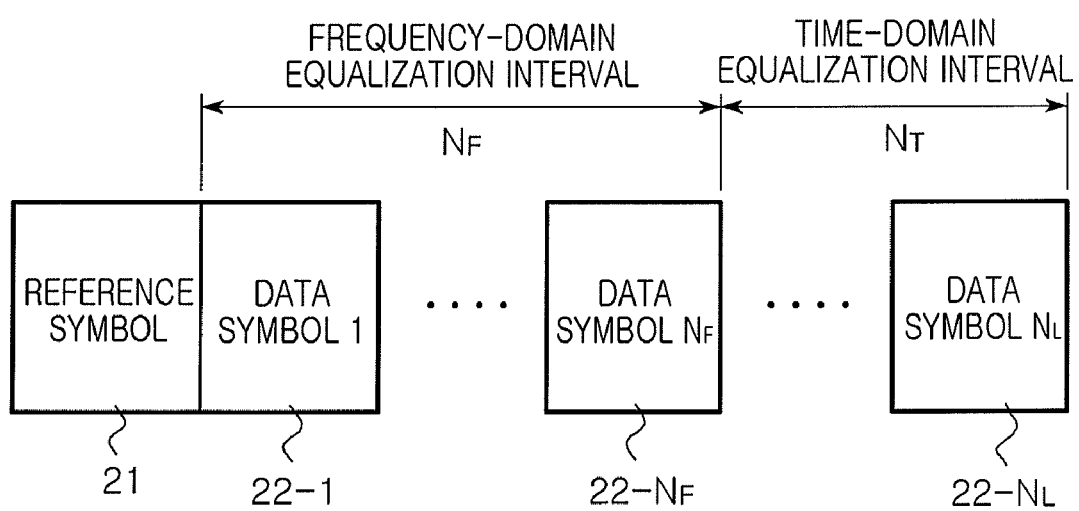
FIG. 2 is a schematic view illustrating a frame structure applied to an OFDM scheme according to the embodiment of the present invention.

The synchronizer 12 detects a position of a reference symbol in a frame structure of the down-converted OFDM signal. FIG. 2 is a schematic view illustrating the frame structure of the OFDM according to the embodiment. Referring to FIG. 2, in one OFDM frame, a first symbol is the reference symbol 21, and a plurality of data symbols 22-1 to 22-$N_L$ are disposed after the reference symbol 21. In the embodiment of the present invention, the symbols 22-1 to 22-$N_F$ located with a predetermined distance (number of symbols) from the reference symbol 21 are subject to frequency-domain equalization, and symbols located beyond the predetermined distance (number of symbols) from the reference symbol 21 are subject to time-domain equalization. The synchronizer 12 performs a function of detecting the position of the reference symbol 21 that is used as a reference for partitioning the OFDM frame into a frequency-domain equalization interval and a time-domain equalization interval.

The synchronizer 12 also detects a starting point of each symbol as well as the position of the reference symbol 21 in the OFDM frame. The synchronizer 12 generates a pulse signal, that is, a symbol enable pulse at the starting point of each symbol.

Returning to FIG. 1, the counter 13 counts the number of symbol enable pulses generated by the synchronizer 12 to detect a distance (number of symbols) of a data symbol from the position of the reference symbol detected by the synchronizer 12. The first and second switches 14a and 14b are switched so as to select the time-domain equalizer 15 or the frequency-domain equalizer 18 according to the counting result of the counter 13.

As described above, in the embodiment of the present invention, the frequency-domain equalization interval and the time-domain equalization interval are partitioned based on the distance from the detected position of the reference symbol. The counter 13 counts the number of symbol enable pulses to detect positions of the symbols, which are used to partition the frame into the frequency-domain equalization interval and the time-domain equalization interval. The count value of the counter 13 may be the detected position of the reference symbol and the number of symbols between the reference symbol and the associated data symbol, that is, the distance therebetween. The count value is used to control an operation of the first and second switches that selects the time-domain equalizer 15 or the frequency-domain equalizer 18. More specifically, if the count value of the counter 13 is equal to or less than a predetermined value, the first switch 14a is operated so that the down-converted OFDM signal is not input to the time-domain equalizer 15. In this case, the second switch 14b may be operated so that the FFT-processed OFDM signal output from the FFT unit 17 is input to the frequency-domain equalizer 18. On the contrary, if the count value of the counter 13 is larger than the predetermined value, the first switch 14a is operated so that the down-converted OFDM signal is input to the time-domain equalizer 15. In this case, the second switch 14b may be operated so that the FFT-processed OFDM signal output from the FFT unit 17 is not input to the frequency-domain equalizer 18.

The distance $N_S$ that are used as a reference for selecting the time-domain equalization or the frequency-domain equalization may be arbitrarily defined by a user. For example, in case of an OFDM signal used for a DMB system, one frame may include 76 symbols, and the first symbol in the frame structure may be the reference symbol. In this case, for the data symbol separated by 50 or more symbols from the position of the reference symbol, an accuracy of frequency-domain equalization may be lowered. Therefore, the distance $N_S$ for the DMB system may be defined to be 50. In other words, in a case where the present invention is applied to a DMB system, the data symbols that are separated by 50 or less symbols from the reference symbol may be subject to the frequency-domain equalization, and the data symbols that are separated by 50 or more symbols from the reference symbol may be subject to the time-domain equalization.

The time-domain equalizer 15 equalizes in the time domain the data symbols that are separated by a distance longer than the predetermined distance $N_S$ from the position of the reference symbol.

More specifically, the time-domain equalizer 15 includes a time-domain equalization arithmetic unit 151, a delay unit 152, a subtractor 153, a first update vector generator 154, and a second update vector generator 155.

The delay unit 152 delays samples in the data symbol output from the time-domain equalizer 15 by the number $N_U$ of samples excluding the CP of the data symbol.

The subtractor 153 obtains an error between the sample and the delayed sample. The first update vector generator 154 generates a first update vector w by using the error.

The second update vector generator 155 obtains a transformation function of the first update vector w. The second update vector generator 155 accumulatively adds a plurality of the transformation function values to generate a second update vector b.

The time-domain equalization arithmetic unit 151 multiplies a complex conjugate transposed value of the second update vector b with the sample of the input data symbol to generate a time-domain-equalized data symbol.

Figure 3A:
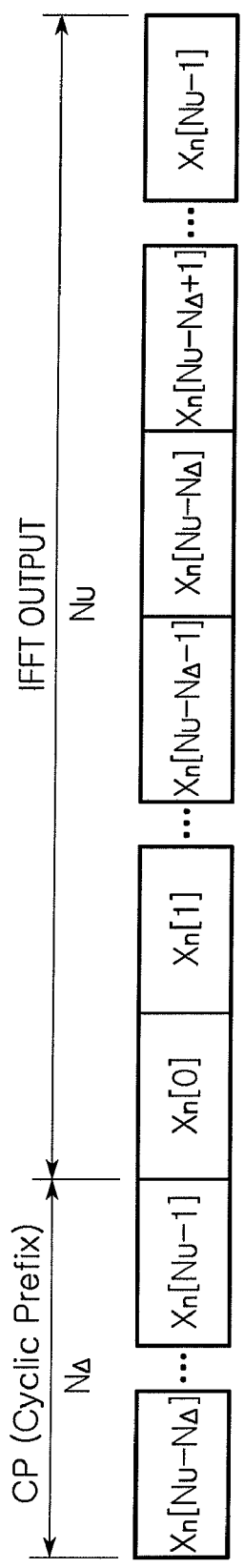
FIGS. 3A and 3B are schematic views illustrating a symbol structure applied to the OFDM scheme according to the embodiment of the present invention.

Now, in order to describe the operations of the time-domain equalizer 15 in detail, an OFDM symbol structure is firstly described with reference to FIG. 3. FIG. 3A illustrates an OFDM symbol structure, in which the CP is inserted into the OFDM symbol that is inverse-Fourier-transformed (IFFT-processed) in the OFDM receiver. $x_n[i]$ denotes an i-th output data of an n-th IFFT-processed symbol, and $N_U$ denotes the number of IFFT-processed output data. $N_A$ denotes the number of CPs.

Figure 3B:
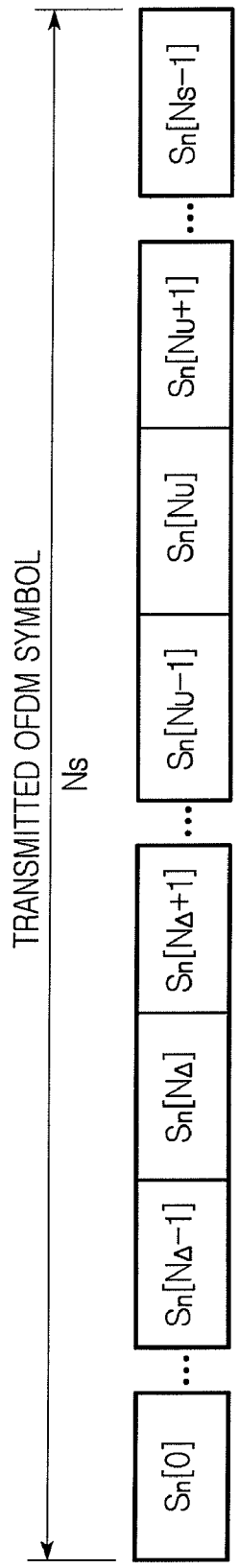

As shown in FIG. 3A, in the OFDM symbol, $N_A$ output data disposed at the rear of the IFFT-processed output data are attached again ahead of another OFDM symbol. The $N_A$ output data attached ahead of the symbol is referred to as the cyclic prefix (CP). As shown in FIG. 3B, one OFDM symbol includes a total number of $N_s$ output data, which is output as one symbol from an OFDM transmitter.

The time-domain equalizer according to the embodiment of the present invention can perform the time-domain equalization in a short time by using characteristics of the OFDM symbol attached with the CP.

Returning to FIG. 1, if the n-th OFDM symbol is separated by a distance longer than the predetermined distance (number of symbols) from the position of the reference symbol, the n-th OFDM symbol is input to the time-domain equalizer 15. The n-th OFDM symbol transmitted from a transmitter passes through a channel and is received by the OFDM receiver. An i-th sample of the received OFDM symbol is denoted by $r_n[i]$ and corresponds to an output data of the transmitter. The n-th OFDM symbol input to the time-domain equalizer 15 is multiplied with a complex conjugated transposed value of the second update vector b in the time-domain equalization arithmetic unit 151 to generate a time-domain-equalized data symbol according to the following Equation 1.

$$v_n[i] = b^H_{n-1,N_B} r_n[i] \quad \text{[Equation 1]}$$

Here, $r_n[i]$ denotes the i-th sample of the n-th OFDM symbol; $v_n[i]$ denotes an i-th sample of the n-th time-domain-equalized OFDM symbol; and $b_{n-1}$ denotes the second update vector.

By using Equation 1, the second update vector $b_{n-1}$ can be determined as follows.

Firstly, a sample of the OFDM symbol (data symbol) output from the time-domain equalization arithmetic unit 151 is delayed by the number of sample excluding the CP of the data symbol in the delay unit 152. Namely, the sample is delayed by the number $N_U$ of the IFFT-processed output data that is IFFT-processed at the time of OFDM transmission.

Next, in the subtractor 153, an error $e_n[i]$ between the sample currently output from the time-domain equalization arithmetic unit 151 and the sample delayed in the delay unit 152 is obtained according to the flowing Equation 5.

$$e_n[i]=v_n[i]-v_n[i-N_U] \quad \text{[Equation 5]}$$

As seen in FIG. 3, since the OFDM symbol includes the CP, the i-th sample is to be equal to the sample delayed by the number of samples excluding the CP of the OFDM symbol. However, in a case where the delay spread caused from a RF channel occurs, the error expressed by Equation 5 is generated. The time-domain equalizer performs an arithmetic operation of compensating for the error.

Next, the first update vector generator 154 generates the first update vector expressed by the following Equation 2 based on the error.

$$w_{n-1}[i]=w_{n-1}[i-1]-2\mu e_n^*[i](r_n[i]-r_n[i-N_U]) \quad \text{[Equation 2]}$$

Here, w denotes the first update vector; e denotes the error between the sample and the delayed sample; and $\mu$ denotes adaptation gain.

Equation 2 is obtained by applying gradient to an instantaneous estimation of a cost function which is defined by using the error $e_n[i]$ expressed by Equation 5. In Equation 2, the adaptation gain $\mu$ is used for a convergence of algorithm.

As described above, the first update vector in Equation 2 is calculated by using an instantaneous error between the samples in the symbol, particularly, an error smaller than a size of the CP. Therefore, if the delay spread caused from an RF channel is larger than the size of the CP, it is difficult to correctly estimate the error. However, according to the present invention, the problem can be solved by using the second update vector that is obtained by accumulatively adding a plurality of transformation function values of the first update vector.

The second update vector generator 155 generates the second update vector by using the following Equation 5.

$$b_{n-1,N_B[i]} = \sum_{k=N_0}^{N_B} g(w_k[i], \beta_k) \quad \text{[Equation 3]}$$

In Equation 3, $b_{n-1}$ denotes the second update vector; and g denotes the transformation function of the first update vector. In addition, $\beta_k$ is an arbitrary coefficient; $N_0$ denotes a starting point where the time-domain equalization is applied; and $N_B$ denotes the number of first update vectors used for calculating the second update vector. According to the embodiment of the present invention, since the time-domain equalization is performed on the OFDM symbol that is separated by a distance longer than the predetermined number N of symbols from the position of the reference symbol, the initial value of the starting point $N_0$ may be $N_s+1$.

The transformation function g may be defined as the following Equation 4.

$$g(w_k,\beta_k)=\beta_k \cdot w_k[i] \quad \text{[Equation 4]}$$

Namely, the transformation function g may be defined as a product of a predetermined coefficient $\beta_k$ to the first update vector $w_k[i]$. In this case, the second update vector is defined as a summation of all the products of the coefficients to the first update vectors obtained respectively from the $N_0$-th symbol to the $N_B$-th symbol. The maximum number $N_B$ of the first update vectors may be a distance to the symbol just before the current symbol, that is, n−1.

Subsequently, the time-domain equalization arithmetic unit multiplies the complex conjugate transposed value of the second update vector with the samples in the input data symbol to generate the time-domain-equalized data symbol.

The CP remover 16 removes the CP from the time-domain-equalized OFDM symbol output from the time-domain equalizer 15 or the OFDM symbol that is not processed by the time-domain equalizer 15. Namely, in case of an OFDM symbol that is determined to be located within the predetermined distance (number $N_s$ of symbols) from the position of the reference symbol by the synchronizer 12 and the counter 13, the CP is directly removed from the OFDM symbol. In case of an OFDM symbol that is determined to be located beyond the predetermined distance (number $N_s$ of symbols) from the position of the reference symbol, the time-domain equalization of the time-domain equalizer 15 is firstly performed on the OFDM symbol, and after that, the CP is removed from the OFDM symbol. The operations can be selected by the first switch 14a controlled by the counter 13.

The FFT unit 17 performs the FFT-process on the CP-removed OFDM symbol.

Among the FFT-processed OFDM symbols, a time-domain-equalized symbol $v_n[k]$, that is, an OFDM symbol that is determined to be located beyond the predetermined distance (number $N_s$ of symbols) from the position of the reference symbol is directly input to the demodulator 19 by using the second switch 14b. A time-domain-non-equalized symbol $R_n[k]$, that is, an OFDM symbol that is determined to be located within the predetermined distance (number $N_s$ of symbols) from the position of the reference symbol is input to the frequency-domain equalizer 18.

The frequency-domain equalizer 18 includes a subtractor 182, a third switch 183, a channel response estimator 184, and a divider 181.

The third switch 183 connects the input port of the frequency-domain equalizer 18 to the subtractor 182 when the FFT-processed data symbol corresponding to the position of the reference symbol detected by the synchronizer 12 is input.

The subtractor 182 subtract the FFT-processed data symbol corresponding to the position of the reference symbol detected by the synchronizer 12 from the predetermined stored reference symbol $V_{ref}[k]$ to calculate an error therebetween.

The channel response estimator 184 generates a channel response function $\hat{H}[k]$ expressing a channel response according to the error.

The divider 181 divides the input FFT-processed symbol with the channel response function to equalize the OFDM symbol in the frequency domain.

In the OFDM signal, only one reference symbol exits in one frame. Therefore, the channel response estimator 184 performs one-time estimation of the channel response function for one OFDM frame. The frequency-domain equalizer 18 performs the frequency-domain equalization by applying one estimated channel response function to the data symbols of the one frame.

The demodulator 19 receives the FFT-processed time-domain equalized OFDM symbol input from the second switch 14b or the frequency-domain-equalized OFDM symbol input from the frequency-domain equalizer 18 and recovers video data and/or audio data by using the equalized OFDM symbols.

According to the present invention, a time-domain equalization scheme and a frequency-domain equalization scheme can be selected according to a distance (number of symbols) between data symbols, so that equalization for an OFDM signal having a frame structure having a small number of reference symbols and a large number of data symbols, for example, an OFDM signal used for DMB can be effectively performed. Accordingly, it is possible to greatly improve reception performance.

In addition, according to the present invention, first update vectors for correcting instantaneous errors calculated from a plurality of symbols are accumulatively applied to time-domain equalization, so that it is possible to improve a performance of the time-domain equalization even in a case where delay spread caused from a channel is increased.

While the present invention has been shown and described in connection with the exemplary embodiments, it will be apparent to those skilled in the art that modifications and variations can be made without departing from the spirit and scope of the invention as defined by the appended claims.

What is claimed is:

1. An OFDM (orthogonal frequency division multiplexing) receiver receiving an OFDM signal having a frame structure constructed with one reference symbol and a plurality of data symbols following the reference symbol, the OFDM receiver comprising:
   a synchronizer which detects a position of the reference symbol from the received OFDM signal;
   a time-domain equalizer which equalizes in a time domain the data symbols that are separated by a distance longer than a predetermined distance from the position of the reference symbol;
   an FFT (fast Fourier transform) unit which performs an FFT process on the OFDM signal; and
   a frequency-domain equalizer which equalizes in a frequency domain the data symbols that are separated by a distance shorter than a predetermined distance from the position of the reference symbol.

2. The OFDM receiver of claim 1, further comprising a demodulator which demodulates the data symbols output from the FFT unit in case of the data symbols that are separated by a distance longer than the predetermined distance from the position of the reference symbol and the frequency-domain-equalized data symbols output from the frequency-domain equalizer in case of the data symbols that are separated by a distance shorter than a predetermined distance from the position of the reference symbol.

3. The OFDM receiver of claim 2,
   wherein the synchronizer generates symbol enable pulses at starting points of the symbols in the frame structure, and
   wherein the OFDM receiver further comprises a counter which counts the number of symbol enable pulses and detects distances of the data symbols from the position of the reference symbol detected by the synchronizer.

4. The OFDM receiver of claim 3, further comprising:
   a first switch which directs the data symbols of which distances detected by the counter are longer than the predetermined distance to the time-domain equalizer and the data symbols of which distances detected by the counter are smaller than the predetermined distance to the FFT unit; and
   a second switch which directs the FFT-processed data symbols of which distances detected by the counter are smaller than the predetermined distance to the frequency-domain equalizer and the FFT-processed data symbols of which distances detected by the counter are longer than the predetermined distance to the demodulator.

5. The OFDM receiver of claim 1,
   wherein the time-domain equalizer comprises:
   a time-domain equalization arithmetic unit which outputs a data symbol and generates a time-domain-equalized data symbol;
   a delay unit which delays samples of the data symbol output from the time-domain equalization arithmetic unit by the number of samples excluding a CP (cyclic prefix) of the data symbol;
   a first update vector generator which generates a first update vector by using an error between the sample currently output from the time-domain equalization arithmetic unit and the delayed sample; and
   a second update vector generator which generates a second update vector by obtaining a plurality of transformation function values of the first update vector and accumulatively adding the transformation function values, and
   wherein the time-domain equalization arithmetic unit generates the time-domain-equalized data symbol by multiplying a complex conjugate transposed value of the second update vector with the samples of the input data symbol.

6. The OFDM receiver of claim 5,
   wherein the time-domain equalization arithmetic unit generates the time-domain-equalized data symbol by using the following Equation 1,
   wherein the first update vector is generated by using the following Equation 2,
   wherein the second update vector is generated by using the following Equation 3, $$v_n[i] = b^H_{n-1,N_B} r_n[i] \quad \text{[Equation 1]}$$

wherein $r_n[i]$ denotes an i-th sample of an n-th OFDM symbol, $v_n[i]$ denotes an i-th sample of an n-th time-domain-equalized OFDM symbol, and $b_{n-1}$ denotes the second update vector, $$w_{n-1}[i] = w_{n-1}[i-1] - 2\mu e_n^*[i](r_n[i] - r_n[i-N_U]) \quad \text{[Equation 2]}$$

wherein w denotes the first update vector, e denotes the error between the sample and the delayed sample, and μ denotes an adaptation gain, $$b_{n-1,N_B}[i] = \sum_{k=N_0}^{N_B} g(w_k[i], \beta_k), \text{ and} \quad \text{[Equation 3]}$$

wherein $b_{n-1}$ the second update vector, g denotes the transformation function of the first update vector, $\beta_k$ denotes a coefficient, $N_0$ denotes a starting point where the time-domain equalization is applied, and $N_B$ denotes the number of first update vectors used to generate the second update vector.

7. The OFDM receiver of claim 6, wherein the transformation function is defined as the following Equation 4, $$g(w_k, \beta_k) = \beta_k \cdot w_k[i]. \quad \text{[Equation 4]}$$

8. The OFDM receiver of claim 1, wherein the frequency-domain equalizer comprises:
   a channel response estimator which generates a channel response function expressing a channel response according to the error between the predetermined stored reference symbol and the FFT-processed data symbol corresponding to the position of the reference symbol; and a divider which generates a frequency-domain-equalized FFT-processed data symbol by dividing the FFT-processed data symbol with the channel response function.

9. A time-domain equalizer comprising:

a time-domain equalization arithmetic unit which outputs a data symbol and generates a time-domain-equalized data symbol;

a delay unit which delays samples of the data symbol output from the time-domain equalization arithmetic unit by the number of samples excluding a CP (cyclic prefix) of the data symbol;

a first update vector generator which generates a first update vector by using an error between the sample currently output from the time-domain equalization arithmetic unit and the delayed sample; and a second update vector generator which generates a second update vector by obtaining a plurality of transformation function values of the first update vector and accumulatively adding the transformation function values, and wherein the time-domain equalization arithmetic unit generates the time-domain-equalized data symbol by multiplying a complex conjugate transposed value of the second update vector with the samples of the input data symbol.

10. The time-domain equalizer of claim 9, wherein the time-domain equalization arithmetic unit generates the time-domain-equalized data symbol by using the following Equation 1, wherein the first update vector is generated by using the following Equation 2, wherein the second update vector is generated by using the following Equation 3, $$v_n[i] = b^H_{n-1,N_B} r_n[i] \quad \text{[Equation 1]}$$

wherein $r_n[i]$ denotes an i-th sample of an n-th OFDM symbol, $v_n[i]$ denotes an i-th sample of an n-th time-domain-equalized OFDM symbol, and $b_{n-1}$ denotes the second update vector, $$w_{n-1}[i] = w_{n-1}[i-1] - 2\mu e_n^*[i](r_n[i] - r_n[i-N_U]) \quad \text{[Equation 2]}$$

wherein w denotes the first update vector, e denotes the error between the sample and the delayed sample, and $\mu$ denotes an adaptation gain, $$b_{n-1,N_B}[i] = \sum_{k=N_0}^{N_B} g(w_k[i], \beta_k), \text{ and} \quad \text{[Equation 3]}$$

wherein $b_{n-1}$ the second update vector, g denotes the transformation function of the first update vector, $\beta_k$ denotes a coefficient, $N_0$ denotes a starting point where the time-domain equalization is applied, and $N_B$ denotes the number of first update vectors used to generate the second update vector.

11. The time-domain equalizer of claim 10, wherein the transformation function is defined as the following Equation 4, $$g(w_k, \beta_k) = \beta_k \cdot w_k[i]. \quad \text{[Equation 4]}$$

* * * * *